United States Patent

[11] 3,600,970

| [72] | Inventor | Alan G. Loofbourrow |
| | | Bloomfield Hills, Mich. |
| [21] | Appl. No. | 852,361 |
| [22] | Filed | Aug. 22, 1969 |
| [45] | Patented | Aug. 24, 1971 |
| [73] | Assignee | Chrysler Corporation |
| | | Highland Park, Mich. |

[54] STEERING COLUMN
13 Claims, 6 Drawing Figs.

[52] U.S. Cl. .................................................... 74/492, 188/1
[51] Int. Cl. .................................................... B62d 1/18
[50] Field of Search ........................................ 74/492, 493; 188/1 C

[56] References Cited

UNITED STATES PATENTS

| 3,373,629 | 3/1968 | Wight et al. ................ | 74/492 |
| 3,394,612 | 7/1968 | Bogosoff et al. ............ | 74/492 |
| 3,479,902 | 11/1969 | Okamoto ..................... | 74/492 |
| 3,482,653 | 12/1969 | Maki et al. .................. | 74/492 |

*Primary Examiner*—Milton Kaufman
*Attorney*—Harness, Talburtt and Baldwin

ABSTRACT: Energy absorbing steering column for a vehicle, including a pair of telescoping tubular members. One of the members has depressions or ridges formed therein in interference with the other member. The depressions or ridges cause the other tubular member to deform upon collapse. Holes may be provided in the depressions or ridges to vary the load under which the column will shorten.

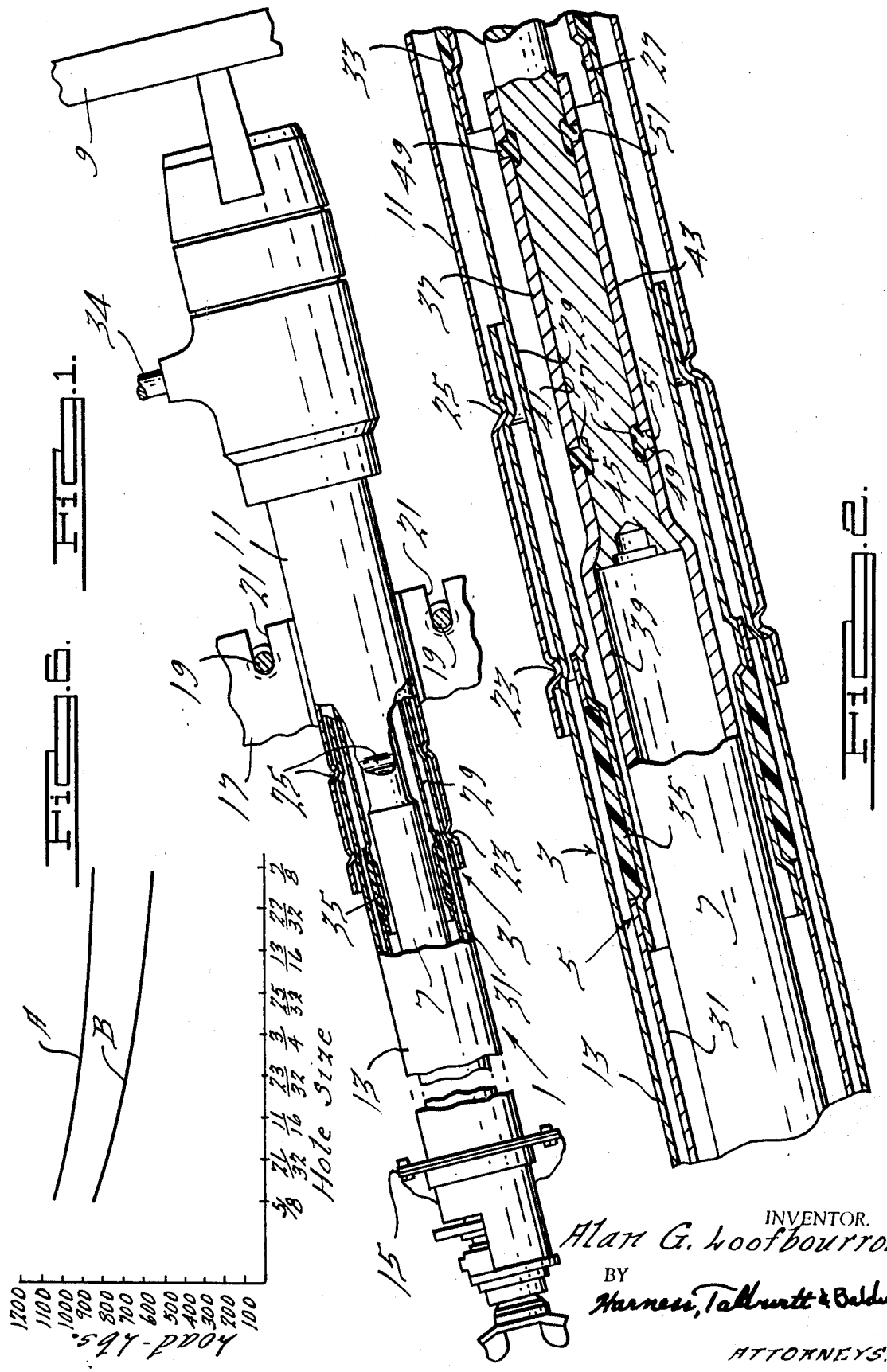

INVENTOR.
Alan G. Loofbourrow.
BY
Harness, Talburtt & Baldwin,
ATTORNEYS.

STEERING COLUMN

BACKGROUND OF THE INVENTION

This invention relates to vehicular steering columns, and more particularly, to an energy absorbing steering column.

Steering columns of the type adapted to collapse upon impact at one end or the other have long been known. Some relatively early collapsible steering columns, such as shown in U.S. Pat. Nos. 2,028,953, for example, issued Jan. 28, 1936, utilized a dash pot concept with oil or other fluid being forced out of a chamber by one end of a steering shaft section upon impact.

More recently, telescoping steering columns, such as shown in U.S. Pat. No.2,836,079, for example, issued May 27 1958, have been developed wherein one column member freely telescopes over another upon impart. Other recent developments include a hollow deformable body attached to the upper end of a steering column and extending upwardly beyond the plane of the steering wheel. Still more recently, steering columns having a length of expanded metal therein adapted to collapse at a controlled resistance upon impact have been developed. Regardless of the speed at which a vehicle driver hits the column, columns of this type are adapted to absorb energy, above a predetermined amount, due to their ability to collapse or shorten with a controlled resistance.

The principles invention provides a predetermined interference between two column also applicable so that shortening of the column results in the controlled deformation of one or both members and the absorption of energy.

SUMMARY OF THE INVENTION

Briefly, this invention comprises an energy absorbing steering column having a pair of telescoping members, one of the members having at least one projection thereon in interference with the other member and adapted to deform the other member upon collapse to absorb energy.

One of the primary objects of this invention is to provide an improved steering column apparatus which is adapted to collapse with a controlled resistance impact at either end of the apparatus.

Another object of this invention is to provide a steering column of the type described which is formed of fewer parts than many known types of columns.

Another object of this invention is to provide a steering column such as described which may be manufactured to shorten with a controlled resistance and absorb energy under different predetermined or required loads by merely changing one or more of several controllable variables.

A further object of this invention is to provide a column of the type described which is adapted to collapse with a predetermined controlled resistance, but which is of sufficient strength to withstand vibrational and other shake forces exerted on the column during even adverse driving conditions.

Still another object of this invention is to provide a steering column such as described wherein the telescoping movement of two members results in the absorption of energy.

Another object of this invention is to provide a column of the type described, the telescoping and energy absorbing characteristics of which can be controlled during manufacturing of the column.

Another object of this invention is to provide a steering column of the class described which is economical in construction and reliable in operation.

Other objects and advantages will be made apparent as the description progresses.

BRIEF DESCRIPTION OF THE DRAWINGS

In the accompanying drawings in which several possible embodiments of this invention are shown, FIG. 1 is a side elevation, partly in section, of one embodiment of a steering column constructed in accordance with this invention, a bracket being rotated 90° for clarity;

FIG. 2 is an enlarged fragmentary view of the apparatus shown in FIG. 1;

FIG. 6 is a graph of static compression load vs. hole size in a steering column of this invention.

Like parts are indicated by corresponding reference characters throughout the several views of the drawings.

DESCRIPTION OF THE PREFERRED EMBODIMENTS

Figure 3:
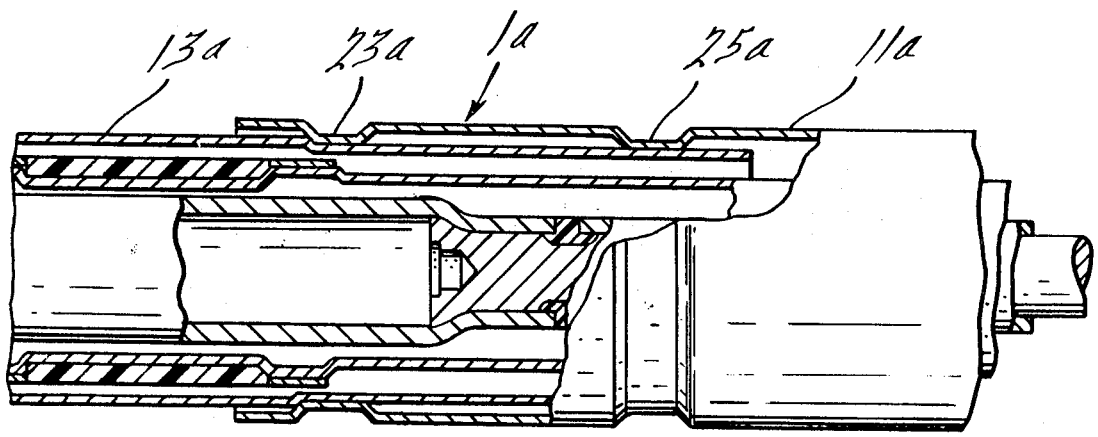
FIG. 3 is a view similar to FIG. 2 illustrating a second embodiment of this invention.

Referring now to the drawings, one embodiment of a steering column constructed in accordance with this invention is illustrated in FIG. 1 at 1. Column 1 is adapted to extend from a steering gear (not shown) at one end upwardly into the passenger compartment of the vehicle at the other end. The column shown is formed of three basic components, namely, the column shown is formed of three basic components, namely, the column jacket section 3, the shift tube 5 and the steering shaft 7.

The steering shaft 7 is connected at its upper end to a steering wheel 9 and is adapted to be connected at its lower end to a steering gear coupling.

Jacket 3 is formed of two telescoped tubular members 11 and 13, the lower of which extends through the vehicle floor 15. The upper tubular member 13 is received by conventional means, such as a bracket 17 and fasteners 19 to the instrument panel (not shown) of the vehicle. The bracket 17 is shown in FIG. 1 as being rotated 90° from its true position and has a pair of open ended slots or recesses 21 through which the fasteners 23 extend. Bracket 17 and fasteners 19 will permit the upper member 11 to be moved downwardly by a predetermined force thereon, but prevent movement of the member 11 in an upwardly direction.

The lower end of upper cylindrical tube 11 is formed with at least two annular external depressions or internal ridges or rings 23 and 25 spaced axially along the column from one another. The inside diameter of the ridge 23 is less than the external diameter of the lower cylindrical tube 13 so that an interference is obtained between the two members. As shown in FIG. 2, the diameter of ridge 25 may be less than the diameter of ridge 23 to cause further energy absorption upon collapse, as described hereinafter.

When the tubes 11 and 13 are collapsed or pressed together with sufficient force, the tube 13 would be permanently deformed by the interference of the ridge 23 with the original diameter of tube 13 and ridge 25 with the diameter of tube 13 after it has been deformed by ridge 23. With the proper selection of sheet metal gauges and the diameters of tubes 11 and 13, and the proper selection of the diameters of ridges 23 and 25, the amount of force necessary to telescope tube 13 inside of tube 11 can be determined and controlled.

The two tubes 11 and 13 may initially be assembled by telescoping tube 13 into tube 11 until the overall length of the jacket reaches a specified amount. During the telescoping of the two tubes in the assembly operation, the load necessary to shorten the overall length of the assembly may be readily determined, thus providing an assembly testing operation for each column. When installed in an automotive vehicle and subjected to loads above the initial assembly load (and above the load necessary to disengage bracket 17 if the column is impacted by the vehicle driver the two tubes 11 and 13 will telescope and absorb a predetermined amount of energy during such telescoping action.

The shift tube may be conventionally formed of a plurality of tubular members 27, 29 and 31 connected by suitable plastic keys 33 and 35 which are preferably adapted to shear at a load less that that needed for collapsing the jacket tubes 11 and 13. Tube 5 is connected at its upper end to a shift lever 34 and to a transmission range shifting element (not shown) at its lower end. Shaft 7 is conventionally constructed of two pieces 37 and 39. The upper piece 37 is solid and has flats 41 and 43 on opposite sides thereof at its lower end. It slides into the upper end of the hollow shaft piece 39 which has a double flatted contour mating with the lower end of piece 37. The lower end of the shaft extends beyond the vehicle floor to the steering gear coupling. The mating flats on piece 37 and piece 39 enable the steering shaft 7 to transmit the turning force of the steering wheel to the steering gear.

Injected plastic rings or collars 45 located in grooves 47 of piece 37 have projections 49 extending outwardly through holes 51 in lower tubular piece 39 for staking the pieces together. The collars take up any clearance between the two mating shafts 37 and 39, and eliminate a source of rattles due to metal to metal clearance.

When the complete column assembly is installed in an automotive vehicle, the column may be collapsed, and absorb energy during such collapse, when impacted at either or both ends with predetermined forces. The plastic projections 49 and keys 35 will shear to permit the shaft 7 and shift tube 5 to collapse. The jacket 3 will collapse with the rings or ridges 23 and 25 causing the diameter of tube 13 to be reduced as the tubes 11 and 13 move relative to one another, thus resulting in the absorption of energy. This absorption of energy aids in the prevention of rebound by the vehicle driver.

In addition to changing the design collapse load by changing the diameters of the ridges 23 and 25, the spacing thereof, and the gauges of the metal of the tubes 11 and 13, other modifications may also be employed. In FIG. 3, an alternative embodiment 1a is shown with ridges 23a and 25a of a greater width than ridges 23 and 25. In addition, both ridges 23a and 25a have the same diameter. Accordingly, ridge 25a acts primarily as a guiding or stabilizing ridge since it does not significantly deform the tube 13a, but rather slides over the latter.

Figure 4:
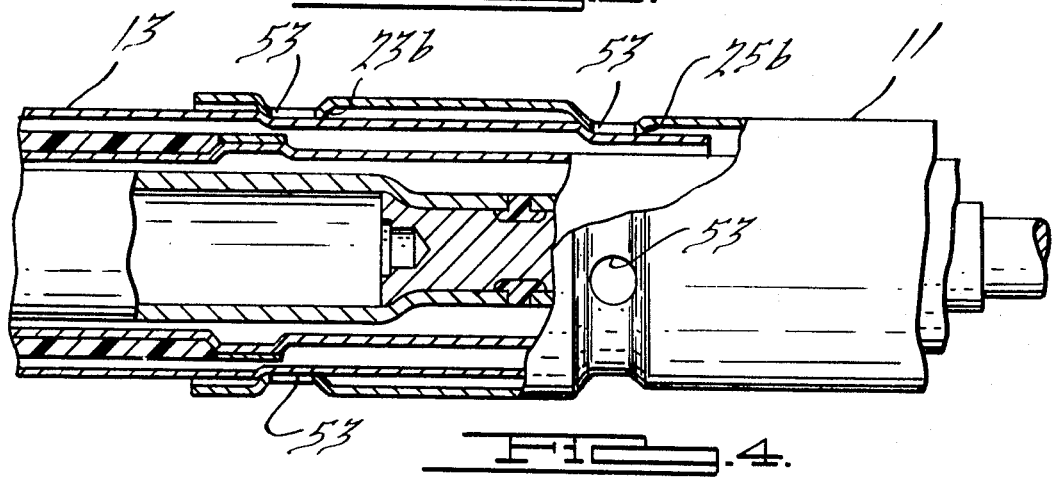
FIG. 4 is a view similar to FIGS. 2 and 3 illustrating a third embodiment of this invention.

The design collapse load of the column formed by the two tubes may also be varied by forming a plurality of holes of a desired diameter in the ridges. In FIG. 4, ridges 23b and 25b have different diameters and also have a plurality of holes 53 spaced apart from one another around each of the ridges 23b and 25b. By varying the number and diameter of the holes the load necessary to collapse the column with a controlled resistance may be varied. For example, the graph shown in FIG. 6 illustrates the average static compression load vs. the hole size for a particular number of holes (4) in the ridges 23b and 25b. The curve designated A represents columns having 0.040–0.045 inch interference between the inner diameter of ridges 23b and 25b and the outer diameter of tube 13, while curve B represents columns having 0.010–0.015 inch interference between the ridge diameter and the tube 13 diameter. The diameters of ridges 23b and 25b were equal in each case. It will be seen that as the diameters of the holes 53 are increased, the collapse load decreases. Thus, it will be seen that the amount of energy absorbed by the column of this invention is dependent upon many variables, including the wall thickness of the tubes employed, the number, diameter, shape and width of the annular recesses or ridges in the tube or tubes, and the number, diameter shape and location of the holes in the ridges, for example. These variables permit a significant latitude in designing the column to meet specifications. This is particularly significant since regulations and standards, such as required collapse loads, for example, for collapsible columns are constantly being reviewed and are always subject to change.

Figure 5:
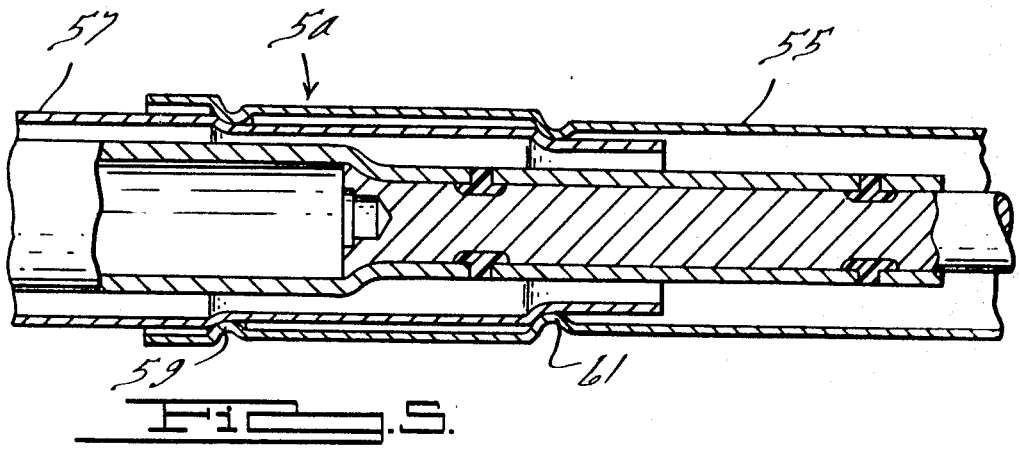
FIG. 5 is a view similar to FIGS. 2–4, illustrating a fourth embodiment of this invention.

The principles of the jacket 3 of this invention are also applicable to the shift tube. In FIG. 5 there is shown a shift tube 5a formed of two tubular members 55 and 57. Ridges 59 and 61 are formed in member 55 for deforming the tube 57 upon collapse of the column. It will be understood that the various modifications shown in FIGS. 1–4 may be applied to the structure shown in FIG. 5.

It will be seen that the column of this invention permits a great latitude in design, while at the same time permits significant performance standards to be achieved.

In view of the foregoing, it will be seen that the several objects and other advantages are achieved.

While several embodiments of the invention have been disclosed and described, it is apparent that other embodiments and modifications of the invention are possible.

I claim:

1. An energy absorbing steering column adapted to be installed in an automotive vehicle, comprising a pair of tubular members having a telescoping relationship with one another and adapted to move relative to one another upon the application of force to at least one of the members, at least one projection extending between said members and into engagement with one of said members, said projection being substantially fixed relative to the other of said members and causing deformation of said one member when said members are moved relative to one another in a direction to cause shortening of said column, said projection comprising at least one ridge extending substantially around said other member.

2. An energy absorbing steering column as set forth in claim 1 including a second ridge extending substantially around said other member and spaced along the axis of said column from the first mentioned ridge.

3. An energy absorbing steering column as set forth in claim 2 wherein said other member is outside said one member, the inside diameter of each of said ridges is less than the normal outside diameter of said one member.

4. An energy absorbing steering column as set forth in claim 3 wherein the inside diameter of said second ridge is less than the inside diameter of the first mentioned ridge.

5. An energy absorbing steering column as set forth in claim 3 wherein at least one of said ridges has a hole therein.

6. An energy absorbing steering column as set forth in claim 3 when each of said ridges has a hole therein.

7. An energy absorbing steering column as set forth in claim 3 wherein the first mentioned ridge has a plurality of holes therein, and said second ridge has a plurality of holes therein.

8. An energy absorbing steering column as set forth in claim 7 wherein the inside diameter of said second ridge is less than the inside diameter of the first mentioned ridge.

9. An energy absorbing steering column adapted to be connected to a steering gear, comprising a pair of tubular members having a telescoping relationship with one another and adapted to move relative to one another upon the application of force to at least one of the members, one of said members having at least one projection extending into engagement with the other member, said projection being substantially fixed relative to said one member and causing deformation of said other member when said members are moved relative to one another in a direction to cause shortening of said column, a shift tube inside said members, said shift tube being adapted to collapse upon sufficient impact thereon, a steering shaft inside said shift tube, said steering shaft being adapted to collapse upon sufficient impact thereon, and said projection comprising at least one annular ridge formed in said one of said members, said ridge being in interference with said other member.

10. An energy absorbing steering column as set forth in claim 9, including a second annular ridge formed in said one member spaced from the first mentioned ridge in an axial direction with respect to said column, said second ridge being in interference with said other member.

11. An energy absorbing steering column as set forth in claim 10 wherein the first mentioned ridge has a plurality of holes therethrough, said holes being spaced from one another around the first mentioned ridge.

12. An energy absorbing steering column as set forth in claim 11 wherein said second ridge has a plurality of holes therethrough, said holes in said second ridge being spaced from one another around said second ridge.

13. An energy absorbing steering column adapted to be installed in an automotive vehicle, comprising a pair of tubular members having a telescoping relationship with one another and adapted to move relative to one another upon the application of force to at least one of the members a projection extending between said members and into engagement with one of said members, said projection being substantially fixed relative to the other of said members and causing deformation of said one member when said members are moved relative to one another in a direction to cause shortening of said column, said projection comprising an annular ridge extending from said other member into engagement with said one member.